(12) United States Patent
Tamura et al.

(10) Patent No.: US 8,452,158 B2
(45) Date of Patent: May 28, 2013

(54) RECORDING APPARATUS, IMAGING AND RECORDING APPARATUS, RECORDING METHOD, AND PROGRAM

(75) Inventors: Masayuki Tamura, Kanagawa (JP);
Tsutomu Shimosato, Kanagawa (JP);
Masashi Kishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 201 days.

(21) Appl. No.: 13/021,534

(22) Filed: Feb. 4, 2011

(65) Prior Publication Data

US 2011/0194836 A1    Aug. 11, 2011

(30) Foreign Application Priority Data

Feb. 10, 2010 (JP) ................................. 2010-028253

(51) Int. Cl.
*H04N 9/80* (2006.01)
*H04N 5/78* (2006.01)
(52) U.S. Cl.
USPC .......................................... 386/248; 386/323
(58) Field of Classification Search
USPC .................. 386/248, 291, 323, 326, 224, 239
See application file for complete search history.

(56) References Cited

U.S. PATENT DOCUMENTS

| 2007/0104463 | A1* | 5/2007 | Ono et al. | 386/112 |
| 2009/0016182 | A1* | 1/2009 | Kubo et al. | 369/47.41 |
| 2009/0226149 | A1  | 9/2009 | Shibata et al. | |
| 2010/0008647 | A1* | 1/2010 | Isobe et al. | 386/96 |

FOREIGN PATENT DOCUMENTS

JP        2008 35394        2/2008

* cited by examiner

*Primary Examiner* — Robert Chevalier
(74) *Attorney, Agent, or Firm* — Frommer Lawrence & Haug LLP; William S. Frommer

(57) ABSTRACT

Disclosed herein is a recording apparatus including: an input section configured to input main data and added data attached to the main data; and a recording control section configured such that when the main data and the added data input through the input section have each reached a predetermined data amount, the recording control section temporarily stores the main data and the added data in units of the predetermined data amount; and that when the sum of the amounts of the temporarily stored data has reached a specific data amount, the recording control section transfers the temporarily stored data to recording media for recording thereto in a single file; the recording control section further registering management data about the recorded data to a file system of the recording media in such a manner that the management data is sorted by the data type of the recorded data.

12 Claims, 13 Drawing Sheets

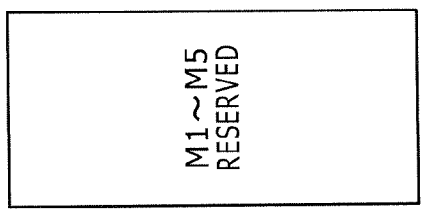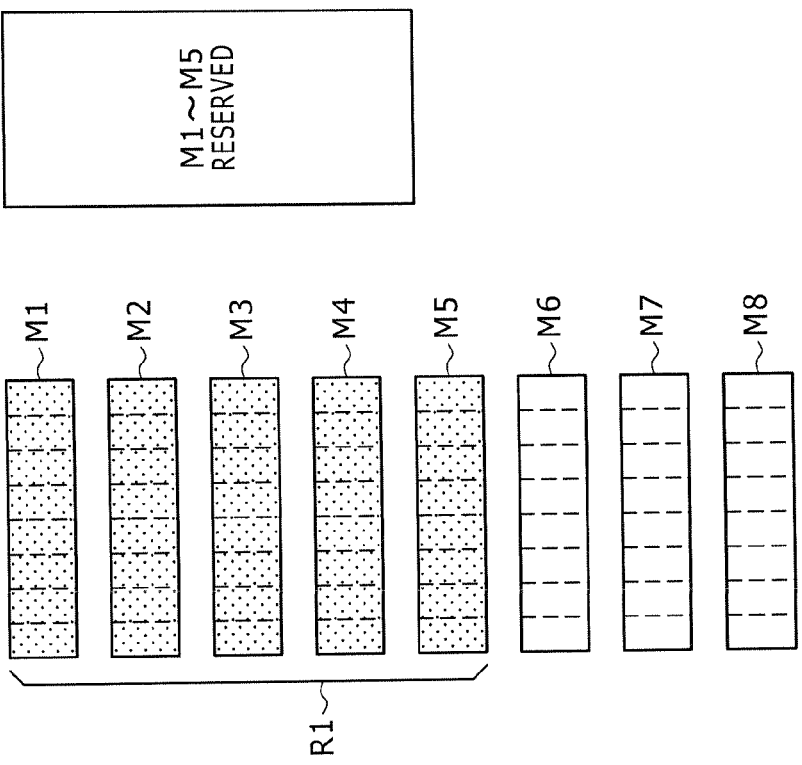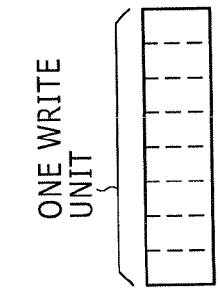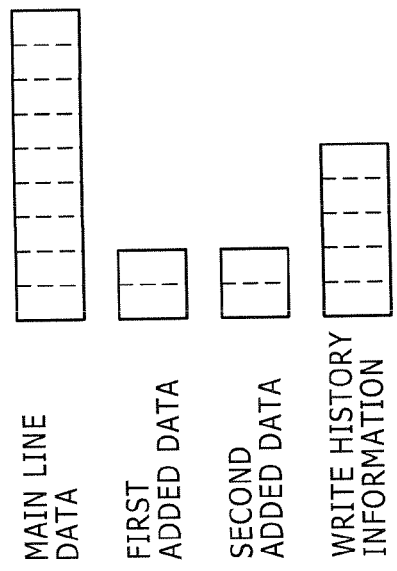

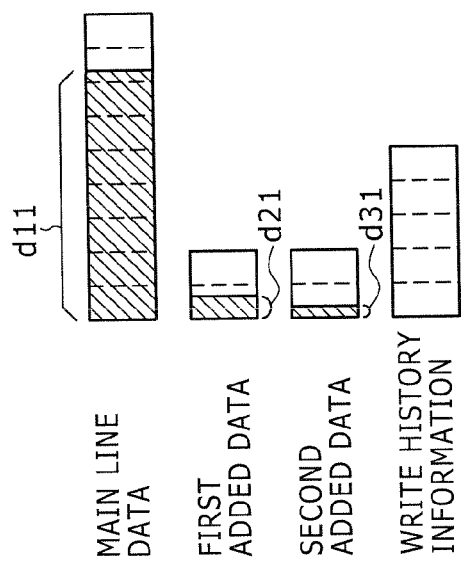
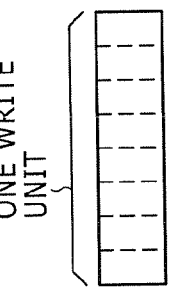
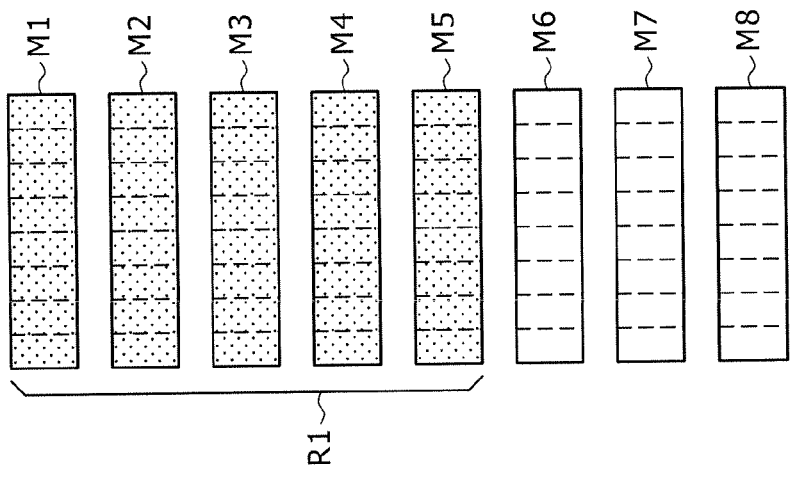
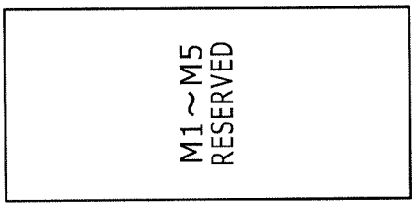

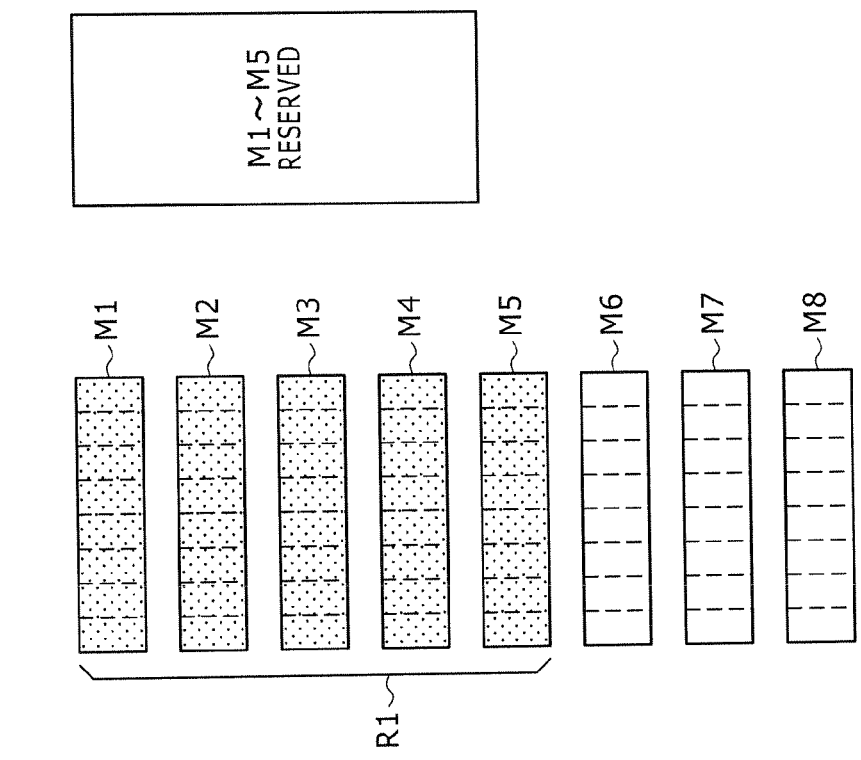

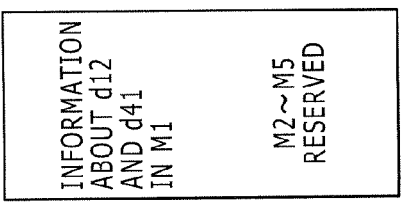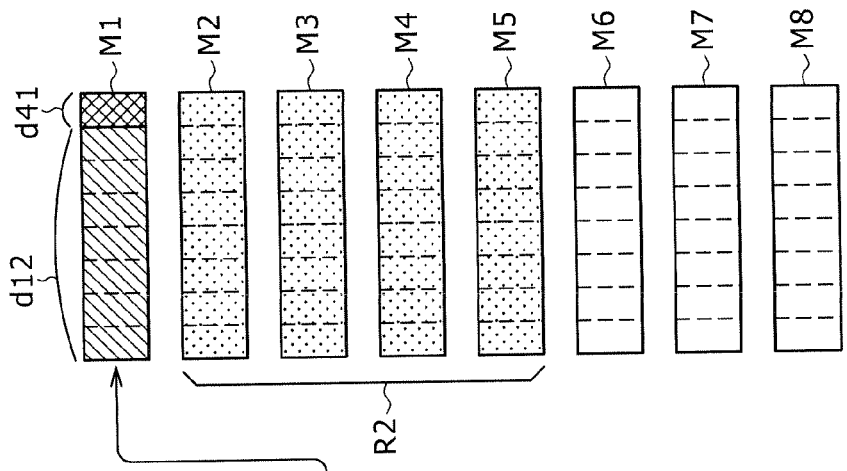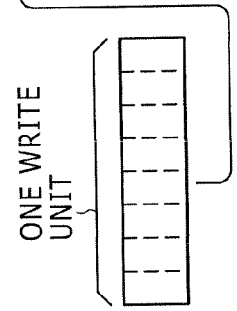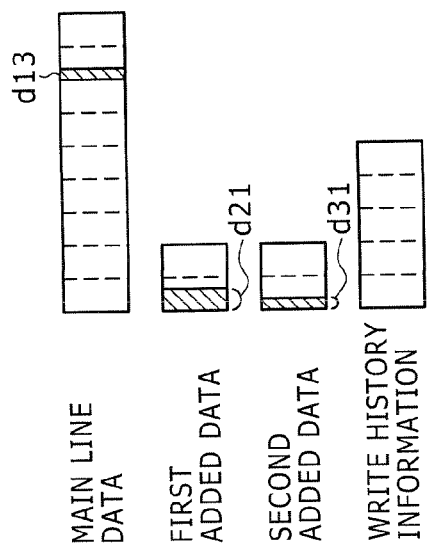

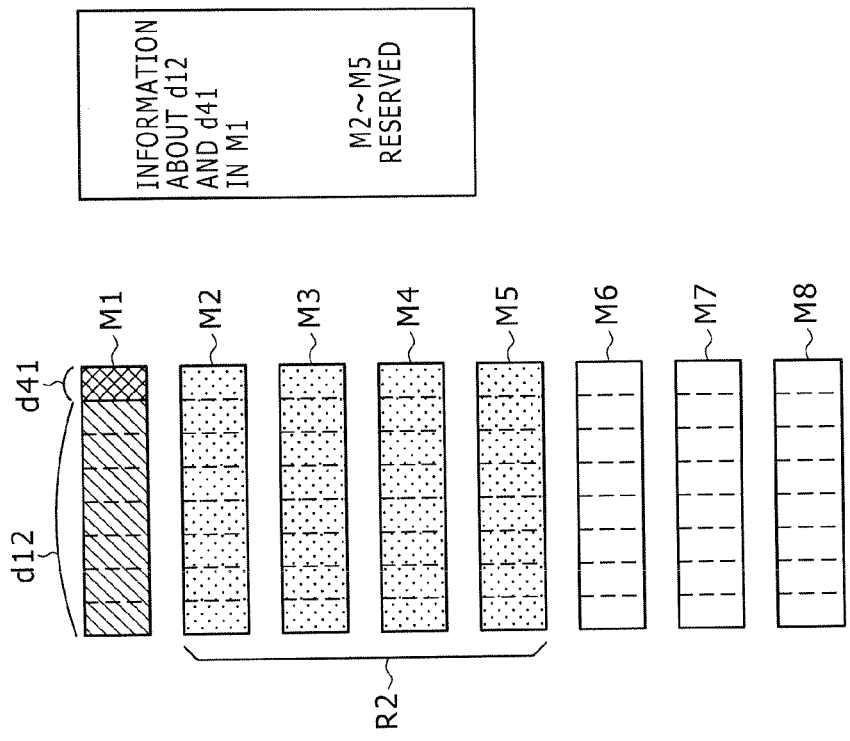

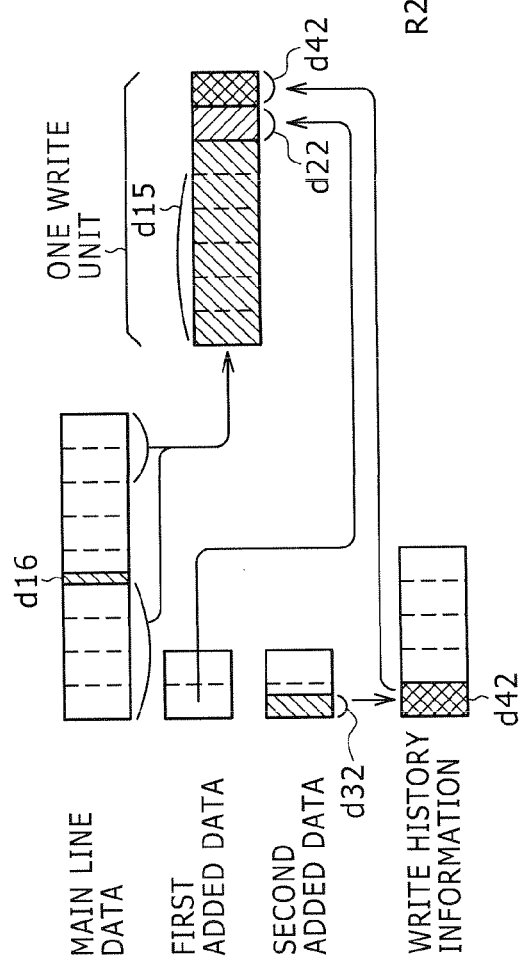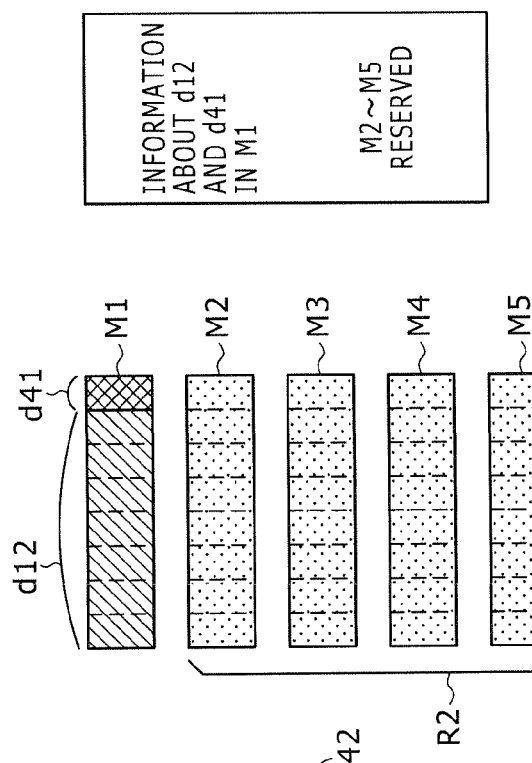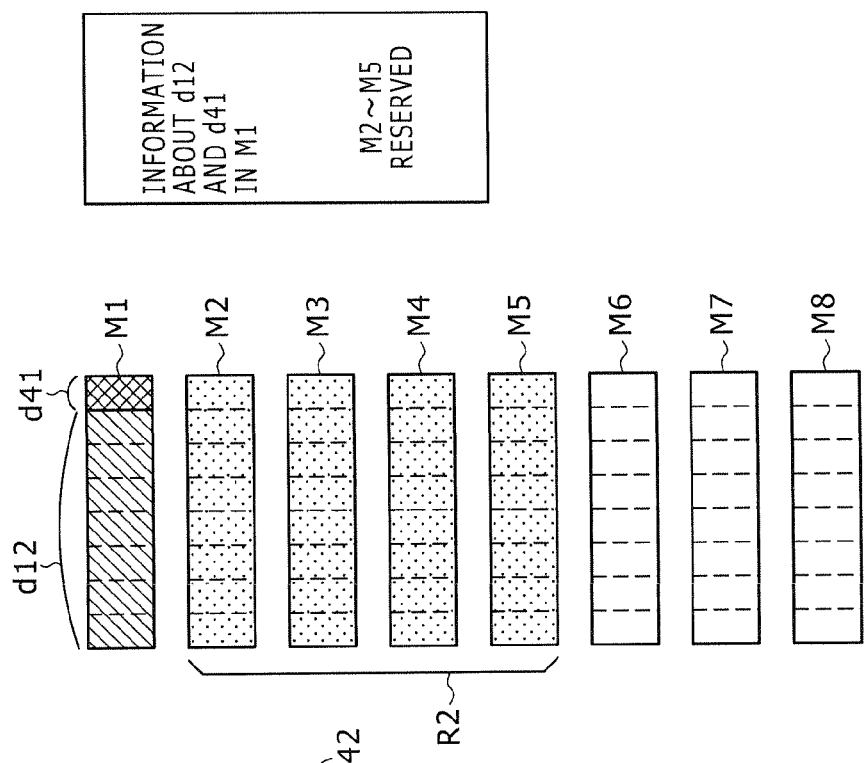

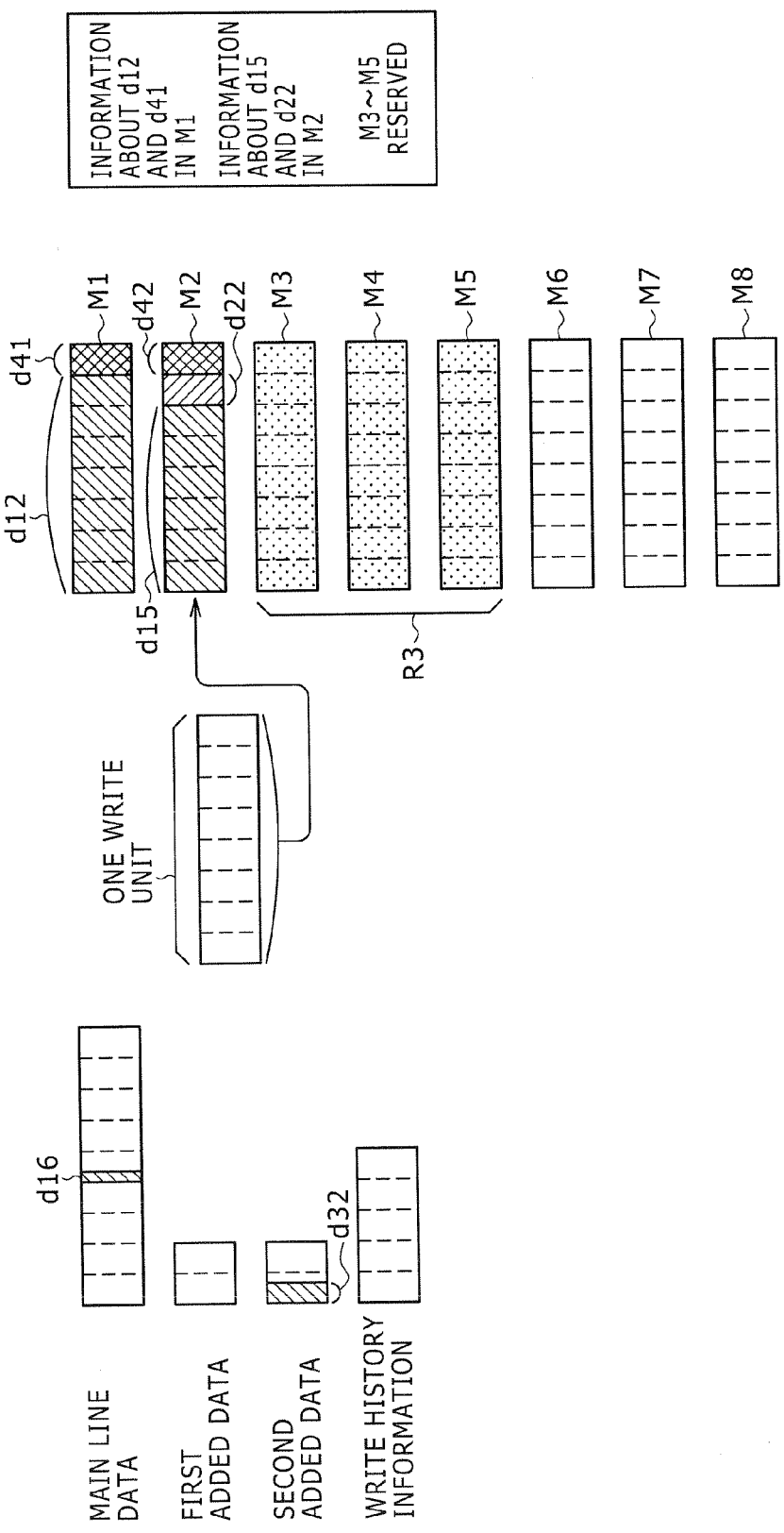

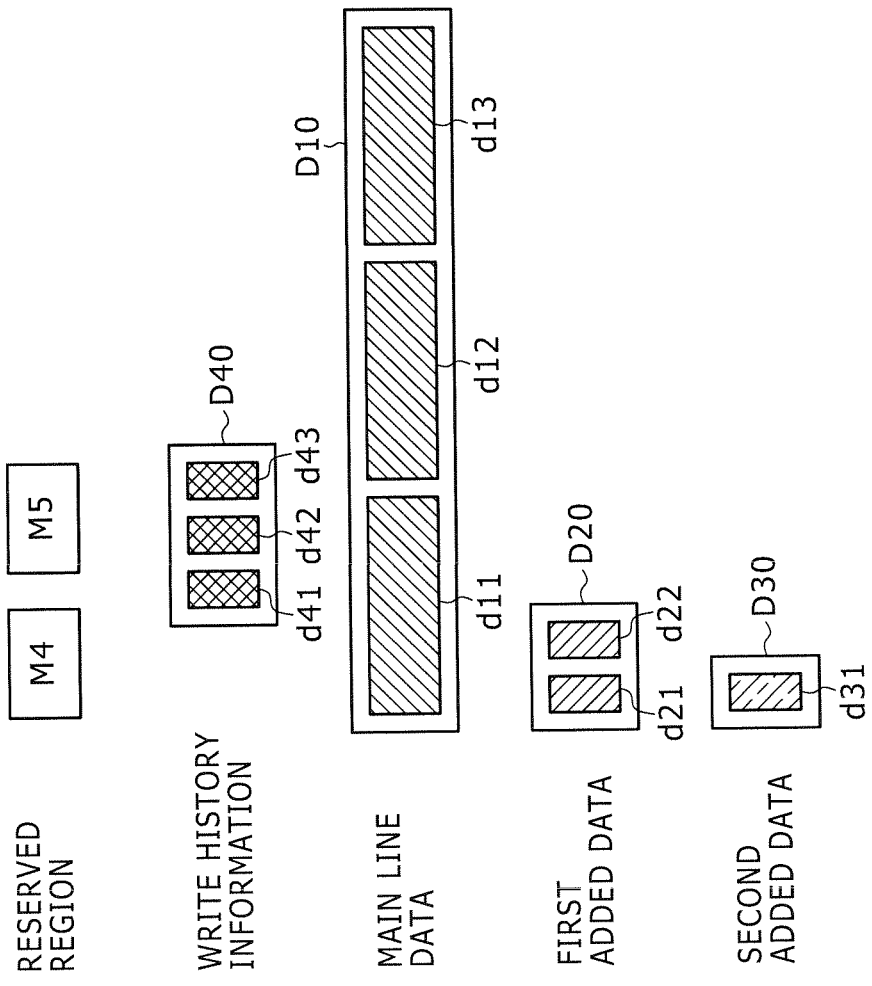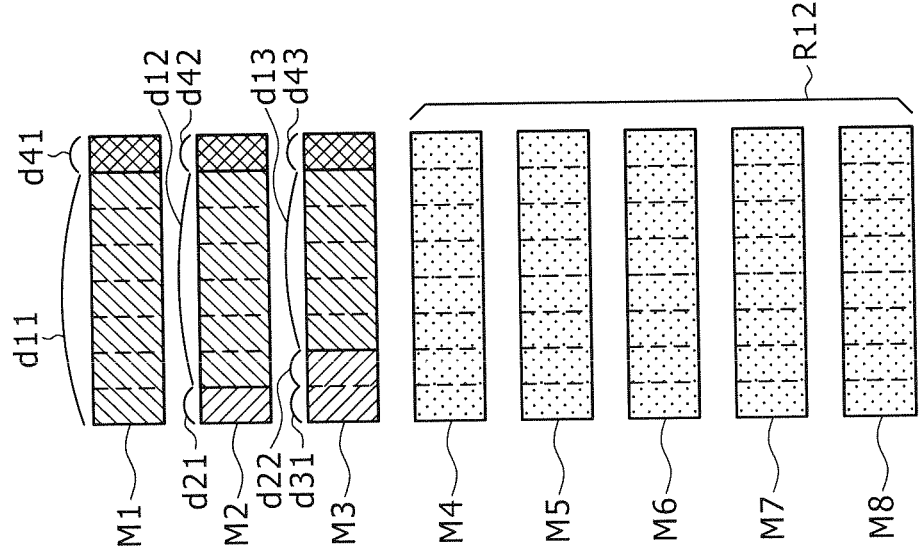

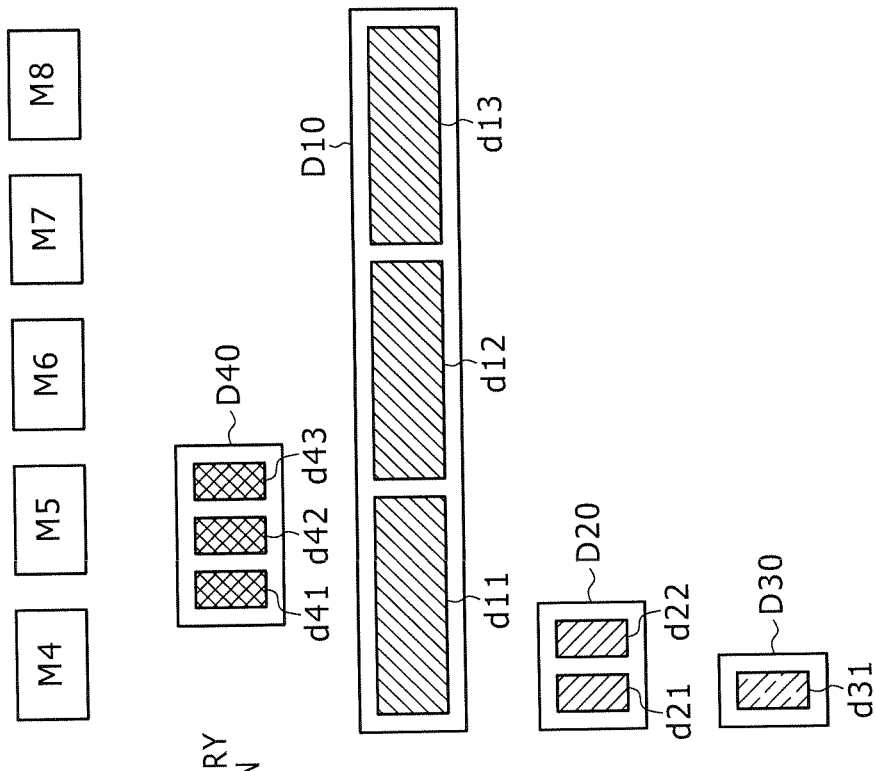
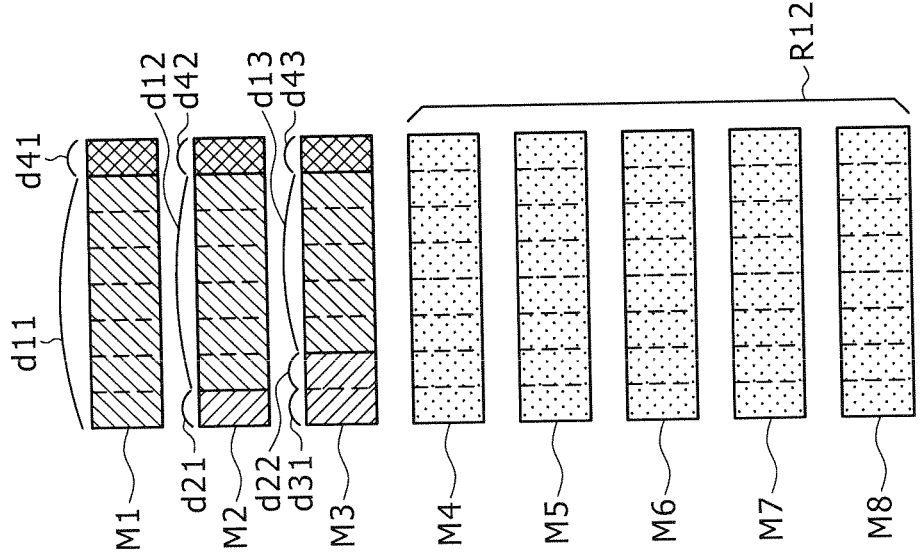

RECORDING APPARATUS, IMAGING AND RECORDING APPARATUS, RECORDING METHOD, AND PROGRAM

BACKGROUND OF THE INVENTION

1. Field of the Invention

The present invention relates to a recording apparatus for recording data using recording media such as a semiconductor memory, to an imaging and recording apparatus equipped with such a recording apparatus, to a recording method for use with such a recording apparatus and such an imaging and recording apparatus, and to a program for executing such a recording method.

2. Description of the Related Art

There have been commercialized various types of imaging and recording apparatuses each operating as an imaging device such as a video camera equipped with a recording capability. Some of the imaging and recording apparatuses developed in recent years utilize memory cards as their recording media, prompted by the widespread use and reduced costs of semiconductor memories constituting the memory cards.

The memory card is smaller and more lightweight than magnetic tapes or various disks that were previously used as the recording media for the imaging and recording apparatuses. Using such a memory card as the recording medium contributes to reducing the size of an imaging and recording apparatus furnished with that memory card. Also, the memory card is easy to attach and remove to and from a card slot in the body of the imaging and recording apparatus.

Japanese Patent Laid-Open No. 2008-35394 (called Patent Document 1 hereunder) discloses composition examples of an imaging apparatus that uses a semiconductor memory as its recording medium.

SUMMARY OF THE INVENTION

Where the semiconductor memory such as memory cards is used as the recording media of recording apparatuses such as video cameras, the following problems have been encountered.

For example, where video data is to be recorded to the semiconductor memory inside a memory card attached to the card slot of an imaging and recording apparatus, the video data acquired by an imaging section of the apparatus is supplied successively to the memory card and recorded to the semiconductor memory inside. The action of recording data to the semiconductor memory is also called storage or writing. In this specification, no distinction will be made among recording, storage, and writing.

The speed of writing data to the semiconductor memory can be increased by performing write and erase operations in units of a predetermined data amount. Thus the supplied video data is not simply forwarded successively to the semiconductor memory for recording; the video data is arranged into units of a predetermined data amount (record units) before being recorded to the semiconductor memory, whereby the speed of data recording is boosted. The record units correspond to so-called erase blocks of semiconductor memories.

Where the transfer rate of the video data acquired by the imaging and recording apparatus is relatively high, the composite video data reaches the data amount of a record unit in a relatively short time period. The video data is then transferred successively to the recording media side for recording to the semiconductor memory therein.

However, the generation rate of the acquired video data typically varies with imaging conditions. For example, if images with their subject remaining substantially stationary are being taken consecutively, the amount of the generated video data may drop, so that the generation rate of the data may decline correspondingly. The transfer rate may also drop if imaging involves a very long frame interval such as when intermittent image pickup is carried out.

Meanwhile, if the imaging operation is abruptly halted for some reason, the video data which has been acquired by the imaging section of the apparatus and which has not yet reached the above-mentioned record unit is not recorded to the memory card.

Even if data is written to the recording medium of the apparatus, if the writing of the data is not reflected in file management information of the recording medium, then the data in question is not handled as recorded data. As a result, the data supposed to have been recorded actually disappears from the recording medium.

When an ordinary video camera is operated to stop the ongoing imaging operation, all acquired video data is recorded to the recording medium; the management data is updated accordingly; and an imaging stop process is performed to conclude the operation. In contrast, if the supply of power to the imaging and recording apparatus is abruptly halted, if the recording medium is removed from its slot during imaging, or if other irregularities are committed while imaging is underway, then the data yet to reach a record unit, or the data with its management information yet to be updated, disappears.

Thus when successively transferred data is to be recorded to the semiconductor memory, it is necessary to take appropriate measures to conduct the recording as efficiently as possible so that any remaining data not recorded to the recording apparatus proper will not occur. Although the problems above are experienced in any mode in which data is being recorded, it becomes particularly problematic when, as mentioned above, a low transfer rate of video data very often leads to a relatively long time period of video data not being recorded to the memory card.

Also, when video data or the like is to be recorded to the semiconductor memory, it is necessary simultaneously to record various added data such as audio data, time code data, and data indicating the correspondence between the video data and the audio data. In such a case, the video data is recorded as the video data while various types of added data are arranged by type into individual categories that are recorded to separate recording regions dedicated to the individual data types in the semiconductor memory.

However, another problem emerges in view of recording efficiency. Where the recording regions of the semiconductor memory are divided by data type so that various types of data are recorded thereto in parallel, some data may be recorded to the recording medium although it has yet to attain a record unit. More specifically, whereas video data is usually generated at a relatively high transfer rate, the above-mentioned added data is characterized by its low generation rate so that writing the added data alone to a single file may well be inefficient. Such inefficient data write operations prevent effective utilization of the recording capacity of semiconductor memories. Moreover, access can be delayed if memory access operations are not carried out in units of an erase block.

The present invention has been made in view of the above circumstances and provides inventive arrangements for performing the recording of data to recording media such as semiconductor memories at high speed and in an efficient manner.

In carrying out the present invention and according to one embodiment thereof, there is provided a recording method including the steps of: when input or generated main data and added data attached to the main data have reached a predetermined data amount, temporarily storing the main data and the added data in units of the predetermined data amount; when the sum of the amounts of the temporarily stored data has reached a specific data amount, transferring the temporarily stored data to recording media for recording thereto in a single file; and registering management data about the recorded data to a file system of the recording media in such a manner that the management data is sorted by the data type of the recorded data.

Where the above-described recording method of the present invention is in use, data is recorded in units of a specific data amount to the recording media. If the specific data amount is made equal to the data amount in which data is rapidly recorded, high-speed data recording is accomplished. And when management data registered to the file system of the recording media following the recording is sorted by the type of the recorded data, it is possible easily to read the recorded data by the data type.

According to an embodiment of the present invention, there is provided a recording apparatus including:

an input section configured to input main data and added data attached to the main data; and a recording control section configured such that when the main data and the added data input through the input section have each reached a predetermined data amount, the recording control section temporarily stores the main data and the added data in units of the predetermined data amount; and that when the sum of the amounts of the temporarily stored data has reached a specific data amount, the recording control section transfers the temporarily stored data to recording media for recording thereto in a single file; the recording control section further registering management data about the recorded data to a file system of the recording media in such a manner that the management data is sorted by the data type of the recorded data.

According to an embodiment of the present invention, there is provided an imaging and recording apparatus including:

an imaging section configured to acquire video data through imaging; and a recording control section configured such that when video data acquired by the imaging section and added data attached to the video data have each reached a predetermined data amount, the recording control section temporarily stores the video data and the added data in units of the predetermined data amount; and that when the sum of the amounts of the temporarily stored data has reached a specific data amount, the recording control section transfers the temporarily stored data to recording media for recording thereto in a single file; the recording control section further registering management data about the recorded data to a file system of the recording media in such a manner that the management data is sorted by the data type of the recorded data.

According to an embodiment of the present invention, there is provided a recording method including the steps of:

when input or generated main data and added data attached to the main data have reached a predetermined data amount, temporarily storing the video data and the added data in units of the predetermined data amount;

when the sum of the amounts of the temporarily stored data has reached a specific data amount, transferring the temporarily stored data to recording media for recording thereto in a single file; and registering management data about the recorded data to a file system of the recording media in such a manner that the management data is sorted by the data type of the recorded data.

According to an embodiment of the present invention, there is provided a program to be installed in and executed by an information processing apparatus, the program including the steps of:

when input or generated main data and added data attached to the main data have reached a predetermined data amount, temporarily storing the main data and the added data in units of the predetermined data amount;

when the sum of the amounts of the temporarily stored data has reached a specific data amount, transferring the temporarily stored data to recording media for recording thereto in a single file; and registering management data about the recorded data to a file system of the recording media in such a manner that the management data is sorted by the data type of the recorded data.

According to the present invention embodied as outlined above, data can be recorded collectively to the recording media in units of a specific data amount suitable for high-speed recording. At the same time, the collectively recorded data is managed appropriately by data type by the file system, whereby management of the recorded data is accomplished advantageously.

BRIEF DESCRIPTION OF THE DRAWINGS

FIGS. 6A, 6B, 6C and 6D are schematic views explanatory of how data is typically recorded by the embodiment (showing a process performed upon reservation);

FIGS. 7A, 7B, 7C and 7D are schematic views explanatory of how data is typically recorded by the embodiment (showing a state in which one write unit of data is input);

FIGS. 8A, 8B, 8C and 8D are schematic views explanatory of how data is typically recorded by the embodiment (showing generation of write history information);

FIGS. 9A, 9B, 9C and 9D are schematic views explanatory of how data is typically recorded by the embodiment (showing data written from a media buffer);

FIGS. 10A, 10B, 10C and 10D are schematic views explanatory of how data is typically recorded by the embodiment (showing an example in which the amount of an added information file has reached one file unit);

FIGS. 11A, 11B, 11C and 11D are schematic views explanatory of how data is typically recorded by the embodiment (showing input to the media buffer in a second cycle);

FIGS. 12A, 12B, 12C and 12D are schematic views explanatory of how data is typically recorded by the embodiment (showing a process of writing data from the media buffer in the second cycle);

FIGS. 13A and 13B are schematic views explanatory of how management data is typically sorted by the embodiment (showing a state in which management information has yet to be recorded); and FIGS. 14A and 14B are schematic views explanatory of how management data is typically recorded by the embodiment (showing a state in which management information has been recorded).

DETAILED DESCRIPTION OF THE PREFERRED EMBODIMENTS

The preferred embodiments of the present invention will now be described under the following headings:
1. Typical structure of the entire imaging apparatus (FIG. 1)
2. Typical structure in which data is written to recording media (FIG. 2)
3. Explanation of the data write unit (FIG. 3)
4. Operations of the data recording process (FIGS. 4 and 5)
5. Specific examples of the data recording operations (FIGS. 6A through 12D)
6. Typical sorting of management data (FIGS. 13A through 14B)
7. Variations

[1. Typical Structure of the Entire Imaging Apparatus]

One preferred embodiment of the present invention will be explained below as an imaging apparatus 1 capable of recording and reproducing video and audio data using a memory card as a piece of removable recording media. Although the imaging apparatus 1 is in fact an imaging and recording apparatus equipped with a recording capability, or an imaging, recording and reproducing apparatus, the inventive apparatus will be simply referred to as the imaging apparatus hereunder.

Although the recording medium for use with this embodiment is called the memory card, the recording medium does not have to be a card type memory as long as it is a removable recording medium incorporating a semiconductor memory. The recording medium may be any one of diverse types of currently commercialized memory devices other than the memory cards. The recording medium may be one of the recording media incorporating something other than the semiconductor memory. In the description that follows, the recording medium for use by this embodiment will be referred to as the recording media.

Figure 1:
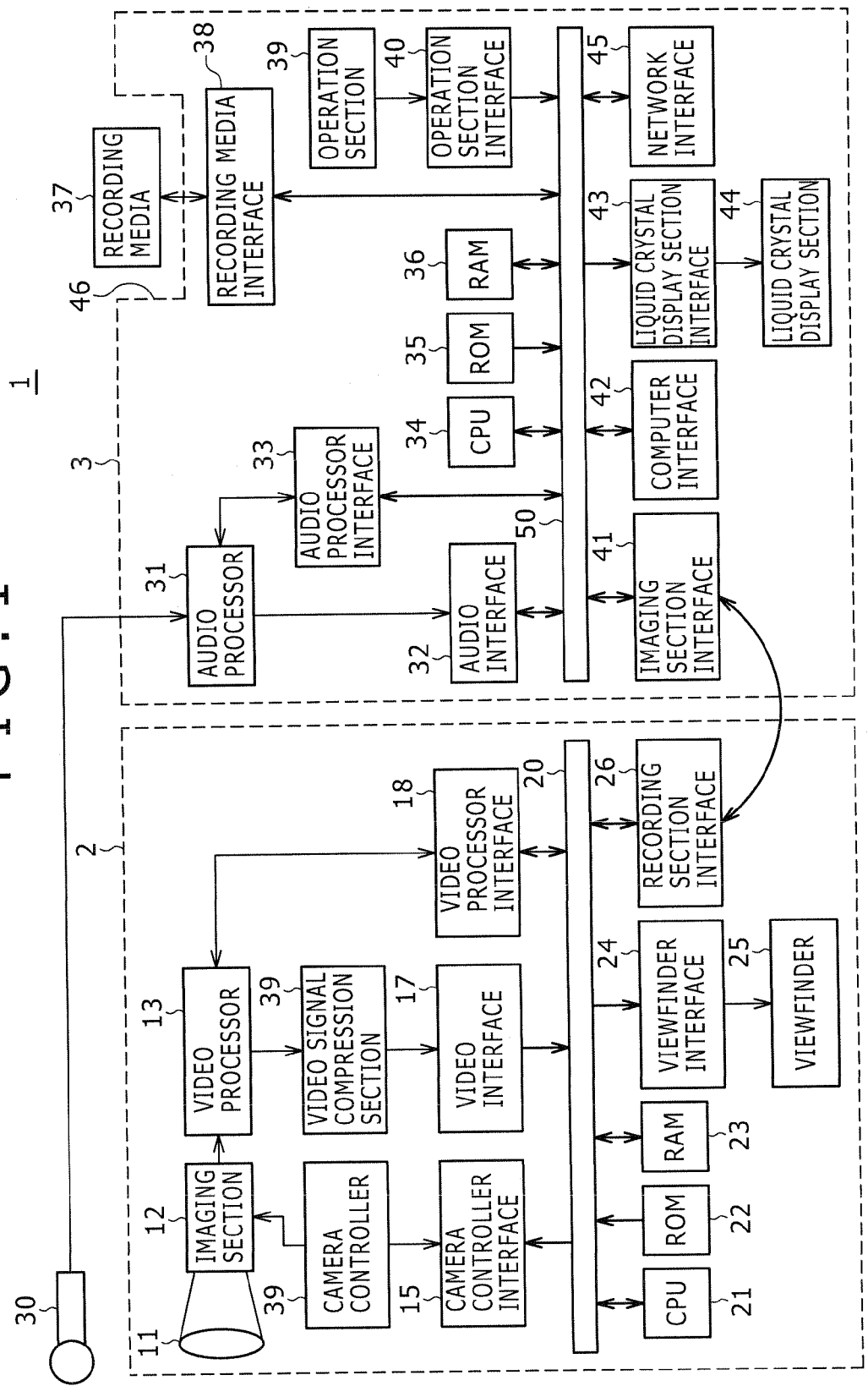
FIG. 1 is a block diagram showing a typical structure of an imaging apparatus as one embodiment of the present invention.

FIG. 1 is a block diagram showing a typical internal structure of the imaging apparatus 1 embodying this invention. The imaging apparatus 1 is made up of an imaging section 2 and a recording section 3, the imaging section 2 controlling a video camera and generating video data thereby, the recording section 3 recording and reproducing video data, audio data, and metadata to and from a semiconductor memory.

What follows is an explanation of the components constituting the imaging section 2. Imaging light is input through an optical section 11 made up of lenses, an aperture, filters, etc. An imaging section 12 subjects the input imaging light to photoelectric conversion to generate an analog video signal. The imaging section 12 is typically constituted by a solid-state image sensing device such as a CCD (charge coupled device) imager. The imaging section 12 thus acquires an imaging signal and supplies it to a video processor 13 that includes an analog/digital converter and an image adjustment facility and the like. The video processor 13 converts the supplied imaging signal to digital video data for image adjustment purposes. The video processor 13 proceeds to send the converted digital video signal to a video signal compression section 16 that compresses digital video data using a predetermined method. The video signal compression section 16 compression-encodes the supplied digital video signal typically according to the MPEG (Moving Picture Experts Group) standard. Then the video signal compression section 16 sends the compressed video data onto a data bus 20 through a video interface 17. The compressed video data is forwarded to the recording section 3 via a recording section interface 26, to be discussed later, for storage into a semiconductor memory inside recording media 37, to be discussed later as well. Diverse kinds of data for use by the imaging section 2 are sent to the relevant components via the data bus 20.

When a user operates an operation section 39, to be discussed later, the recording section 3 feeds an operation signal reflecting the user's operation to a CPU 21 via the imaging section interface 41, the recording section interface 26 and data bus 20. The CPU (central processing unit) 21 acting as control means to control the components of the imaging section 2 interprets the supplied operation signal. Upon interpreting the operation signal, the CPU 21 reads a control program from a ROM 22 in a suitably timed manner and stores temporary data and parameters and the like temporarily into a RAM 23. The ROM 22 is a read-only memory, and the RAM 23 is a random access memory to which data can be written.

The CPU 21 converts the operation signal fed from the operation section 39 into a control signal for driving the imaging section 12, and sends the control signal to a camera controller 14 via a camera controller interface 15. Based on the supplied control signal, the camera controller 14 controls aperture, zoom, and filter operations of the imaging section 12. Also, the CPU 21 supplies an image processing signal designating image processing to the video processor 13 via a video processor interface 18. Based on the supplied image processing signal, the video processor 13 performs a compression process on the digital video signal.

The imaging section 2 includes a viewfinder 25 that displays the images being taken, reproduced images, and metadata. The currently taken images, reproduced images, and metadata transmitted over the data bus 20 are displayed on the viewfinder 25 having a liquid crystal display via a viewfinder interface 25.

The components of the recording section 3 will now be explained below. A microphone 30 pointed in the direction of an object picks up ambient sounds to generate analog audio data. The microphone 30 supplies the analog audio signal thus generated to an audio processor 31 that includes an analog/digital converter and an audio adjustment facility and the like. The digital audio processor 31 converts the supplied analog audio signal into digital audio data for audio adjustment purposes. And the audio processor 31 feeds the digital audio data onto a data bus 50 via an audio interface 32. The audio data is stored into the semiconductor memory inside a recording media 37, to be discussed later. Diverse kinds of data for use by the recording section 3 are sent to the relevant components via the data bus 50.

The operation section 39 made up of buttons, switches, etc., not shown, is used to perform recording, reproducing, and editing operations on the imaging section 2 and recording section 3. A manual operation such as one for starting imaging performed on the operation section 39 causes the section 39 to generate an operation signal. The operation section 39 supplies the generated operation signal to a CPU 34 for control over the components inside the recording section 3, via an operation section interface 40 and the data bus 50. At recording time, operation signals are supplied to the imaging section 2 via an imaging section interface 41, to be discussed later. The CPU 34 interprets the supplied operation signal and reads the control program from the ROM 35 in a suitably timed manner, while storing temporary data and parameters and the like temporarily into the RAM 36.

The imaging apparatus 1 of this embodiment has its recording section 3 equipped with a card slot 46 to and from which the recording media (memory card) 37 can be attached and removed. The recording media 37 incorporates a semiconductor memory. Data recording states inside the recording media 37 will be described later.

The recording media 37 attached to the card slot 46 can transfer data to and from a data processing section inside the recording section 3 via a recording media interface 38.

Although the structure of FIG. 1 shows one card slot 46, the recording section 3 may be structured alternatively to have a plurality of card slots. And apart from the recording media 37 attached to the card slot 46, the recording section 3 may contain another recording medium such as a memory or a hard disk to which video data or other data may be recorded.

The imaging section interface 41 is connected to the data bus 50 to let the recording section 3 exchange data with the imaging section 2. The video data acquired by the imaging section 2 is supplied and recorded to the recording media 37 via the recording section interface 26, imaging section interface 41, data bus 50, and recording media interface 38. At the time of recording, the CPU 34 functions as a recording control section that performs a control process for recording purposes.

The CPU 34 causes a liquid crystal display section 44 to display on its liquid crystal display screen monitor images, time codes, audio levels, metadata, and various menus by way of the data bus 50 and a liquid crystal display interface 43. The video data, audio data and other data retrieved from the recording media 37 may also be displayed as reproduced video images on the liquid crystal display section 44.

The imaging section 1 is furnished with a computer interface 42 for exchanging data with an external computer. The computer interface 42 complies typically with the USB standards and is capable of transmitting data to an externally connected computer, not shown, and of causing connected speakers to output reproduced audio data audibly. Also, the imaging apparatus 1 is furnished with a network interface 45 used for data exchanges over a network. The network interface 45 may be connected to a server or an external computer, not shown, for transfer of data thereto and therefrom.

[2. Typical Structure in which Data is Written to Recording Media]

Figure 2:
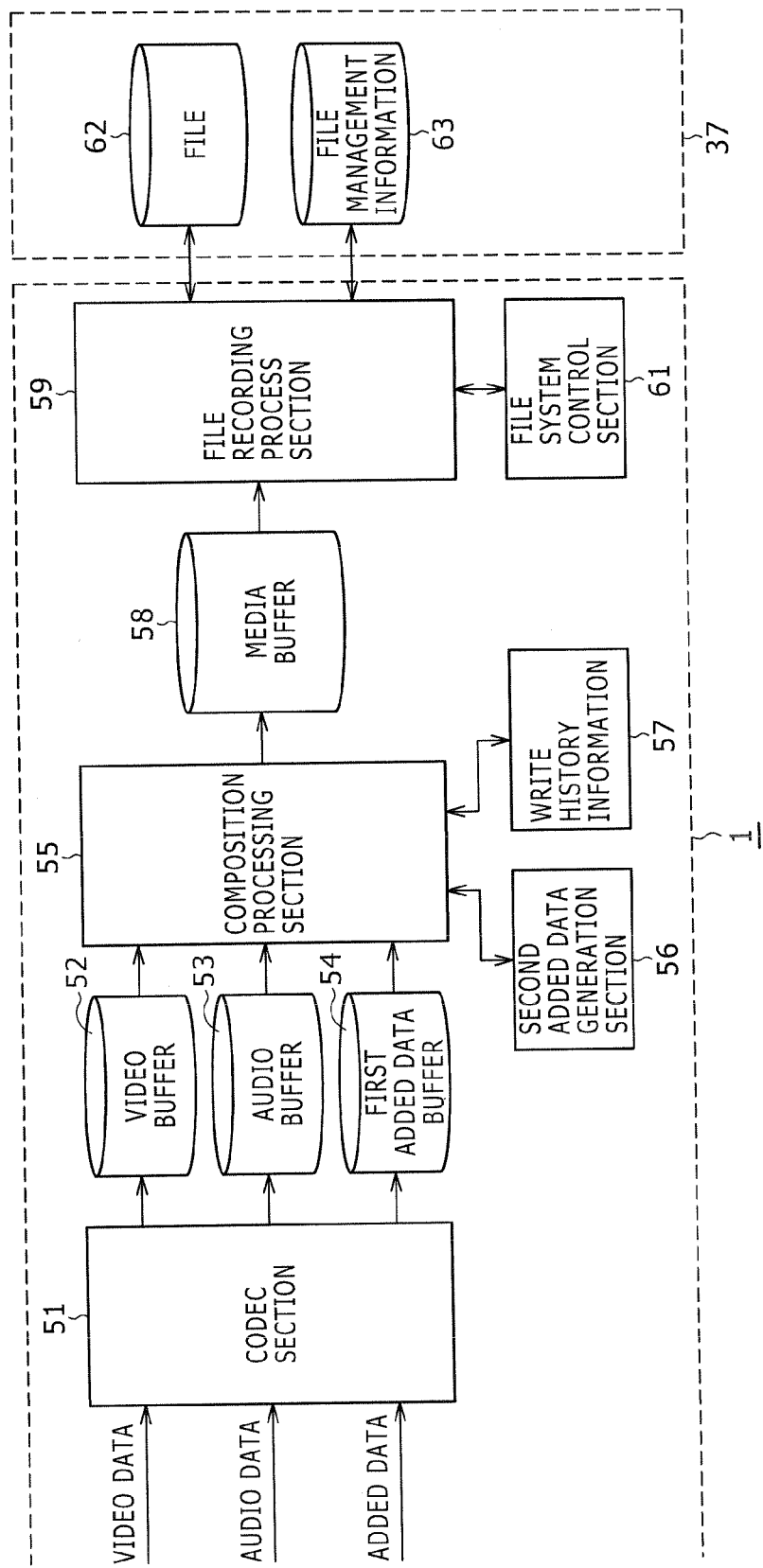
FIG. 2 is a block diagram showing a typical structure in which data is recorded by the embodiment.

Described below in reference to FIG. 2 is a processing structure in which the imaging apparatus 1 records video data and other data to the recording media 37.

FIG. 2 is a functional block diagram depicted in terms of the flow of data to be recorded. Diverse processes shown in FIG. 2 are carried out using the video processor 13, CPU 21, CPU 34, RAM 23, and RAM 36 indicated in FIG. 1.

Where video data is to be recorded to the recording media 37 with this embodiment, an added information (i.e., added data) file and write history information are recorded and processed in addition to the video data and audio data constituting the main data. The data in the added information file is data such as time codes that are generated in conjunction with video data (the data in the file is called metadata). The added data is generated by relevant blocks in the imaging section 2 and recording section 3 before being input to a recording block of the recording section 3. The time code indicates a point in time of each frame position.

In the ensuing description, the added data described above will be referred to as first added data that is distinguished from second added data, to be described later.

As shown in FIG. 2, video data, audio data, and the first added data are supplied to a codec section 51 and compressed and encoded thereby for recording purposes, before being stored temporarily in buffers dedicated individually to different types of data. That is, there are provided a video buffer 52, an audio buffer 53, and an added information buffer 54 which accommodate the corresponding input data.

The data stored in the buffers 52, 53 and 54 are sent to a composition processing section 55 for composition into a single stream of data, and the composite data is stored into a media buffer 58. The media buffer 58 acts as storage means to store a single write unit of data, i.e., an amount of data to be recorded in a single write operation in being recorded to the recording media 37. In this example, the amount of data recorded to the recording media 37 in a single write operation is equal to the smallest increment of data in which data is erased from the recording media 37.

The composition processing section 55 is connected with a second added data generation section 56 and a write history information generation section 57. The second added data generation section 56 generates data (second added data) that serves as a pointer pointing to the correspondence between video data and audio data. The second added data thus generated is input to the composition processing section 55.

The write history information generation section 57 generates write history information attached to each unit of data that is recorded to the recording media 37. Details of the write history information will be discussed later.

The generated second added data and write history information are also composited by the composition processing section 55. Although not shown, the second added data in this structure is also sent to the composition processing section 55 in units of a data amount commensurate with the amount of data being generated by the second added data generation section 56 and stored into an internal buffer. The write history information is generated every time one unit of data is recorded to the recording media 37.

When write data fed from the composition processing section 55 to the media buffer 58 is accumulated in the latter to a level equal to one write unit, the content of the media buffer 58 is output to a file recording process section 59 under control of the CPU 34 acting as the recording control section. The data sent to the file recording process section 59 is output to the recording media 37 for recording thereto as a file 62. Management data about the file 62 is record as file management data 63 in a region apart from the file 62. The data recorded as the file management data 63 is controlled by a file system control section 61 connected to the file recording process section 59.

The data stored in the media buffer 58 is sent successively beginning with a start block to the recording media 37. The data is recorded to the file 62 of the recording media 37 in the order in which the data was sent to the media 37.

[3. Explanation of the Data Write Unit]

Figure 3:
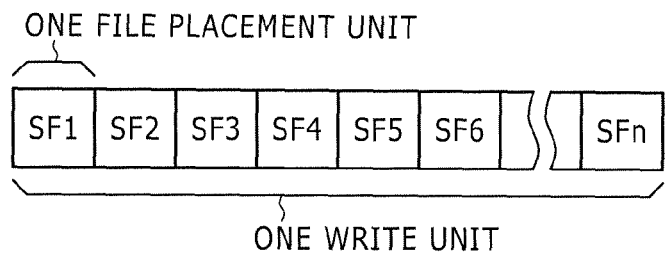
FIG. 3 is a schematic view explanatory of a data write unit for use by the embodiment.

FIG. 3 is a schematic view outlining a data write unit in which data is recorded to the recording media 37.

As shown in FIG. 3, one write unit (one recording unit) is established as a capacity equal to an integer multiple of a file placement interval (one block). That is, blocks SF1, SF2, . . . , SFn ("n" is an integer) are arranged to constitute one file write unit. In this example, one file write unit is arranged to match a block erase unit of the semiconductor memory 37 for use by this embodiment. The recording media 37 used by this embodiment is characterized by its rapid accessibility when accessed in units of this file placement interval. One file placement interval is constituted by a unit of multiple sectors, i.e., by the capacity of an integer multiple of a sector that is the smallest increment. Data can be accessed at high speed in units of this file placement interval.

As typical data units, one sector on certain recording media is set to 512 bytes while the multiple sector unit in which data can be read rapidly is set to 32 KB. For this embodiment, one file placement interval is a multiple of the multiple sector unit (32 KB) that permits high-speed data read operations, so that recorded data is read out rapidly in units of one file placement.

Typically, one file placement interval (one block) may be 2 MB and one write unit may be 16 MB. In this case, one write unit is made up of eight blocks. By letting one write unit coincide with the erase block unit, it is possible to carry out write operations at high speed.

The media buffer 58 shown in FIG. 2 has a storage capacity of a single write unit. It should be noted that these values and block counts are examples.

[4. Operations of the Data Recording Process]

Figure 4:
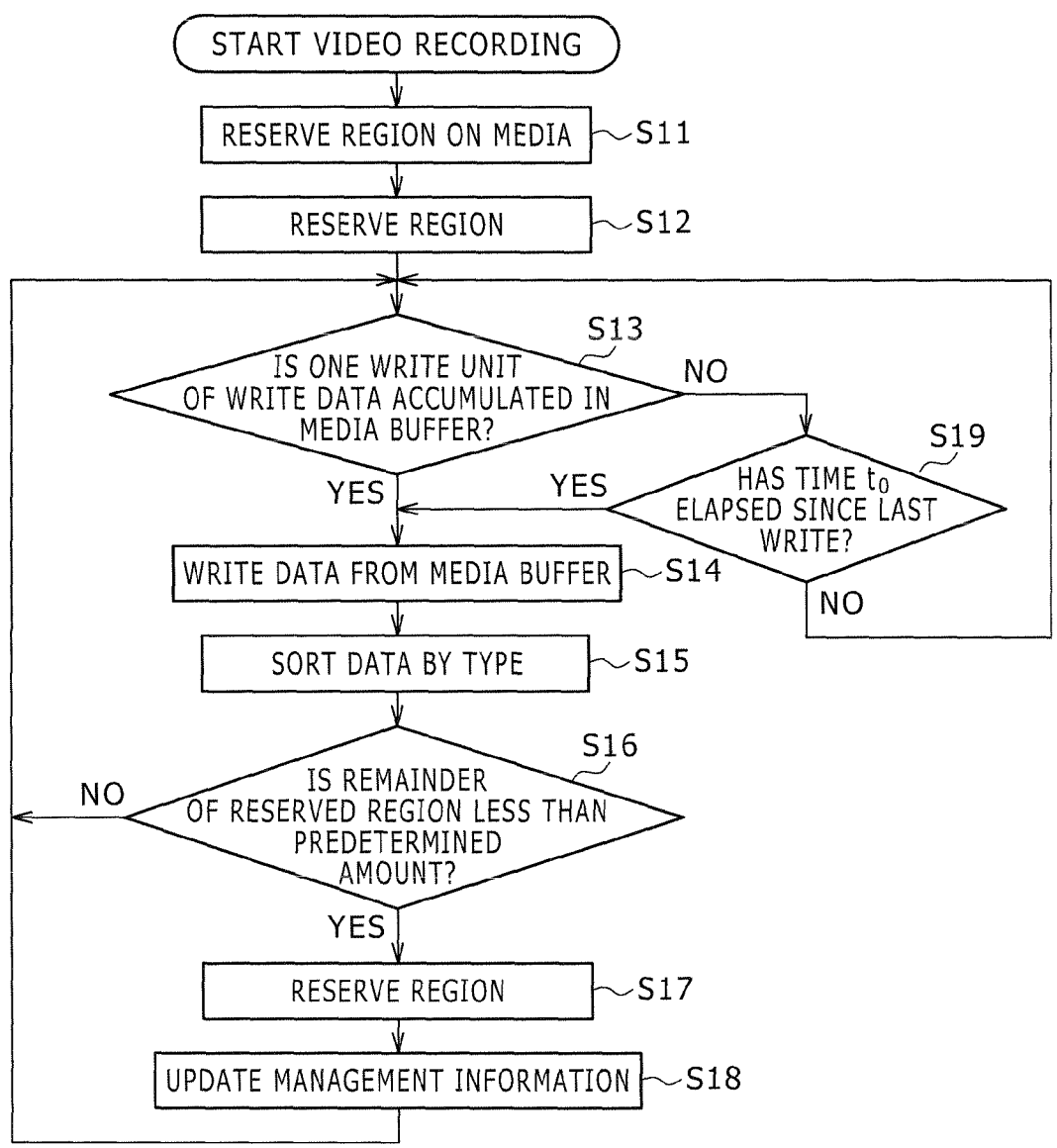
FIG. 4 is a flowchart showing a typical write process performed by the embodiment.
Figure 5:
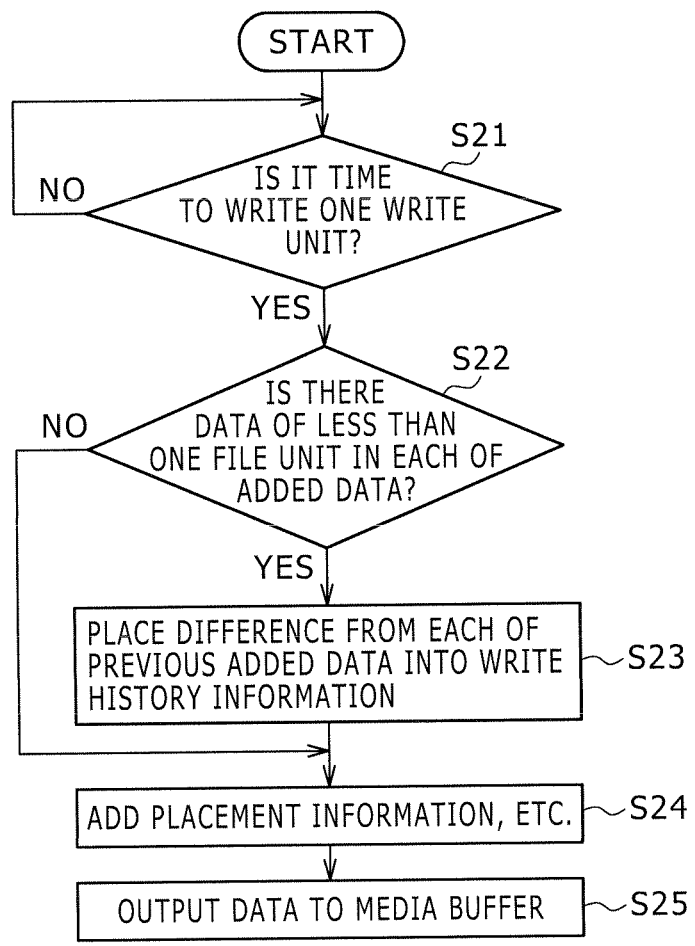
FIG. 5 is a flowchart showing a typical process of generating write history information performed by the embodiment.

Described below in reference to FIGS. 4 and 5 is the data recording process performed by the imaging apparatus as the embodiment of the present invention.

As shown in FIG. 4, when the process of recording video data is started, the CPU 34 in charge of recording control reserves a recording region on the recording media (in step S11). The recording region is reserved in units of an integer multiple of one write unit indicated in FIG. 3. In order to finalize the reservation, management data is written to the file management information 63 in the recording media 37 (in step S12).

As described, the reservation is made by simply writing relevant management information to the recording media. The actual recording region thus reserved is not subject to any particular processing. If any previously written data is found in the reserved region, the data is left.

The CPU 34 in charge of recording control determines whether or not one write unit of write data is stored in the media buffer 58 (in step S13). If it is determined that one write unit of write data is stored in the media buffer 58, the stored data is transferred from the media buffer 58 to the recording media 37 and recorded to the file 62 as the recording section of the recording media 37 (in step S14). At this point, the data is transferred successively beginning with the start data from the media buffer 58 to the recording media 37. The transferred data is written successively beginning with the start data to the recording section inside the recording media 37, whereby one write unit of write data is recorded as a single file.

Later, the data recorded collectively in increments of one write unit is sorted by data type (in step S15). The sorting process is accomplished by rewriting the file management information managed by a file system. The data types are determined based on the write data placed in the media buffer 58. The process of sorting data is performed by the file system control section 61 in FIG. 2. At this point, data has yet to be written to the file management information 63 on the recording media 37. The management data having undergone the sorting process is held by the file system control section 61.

Then it is determined whether or not the reserved region on the recording media 37 has less than a predetermined amount and needs to be expanded (in step S16). If it is determined that the reserved region needs to be expanded, then a relevant region reservation process is performed (in step S17). The region reservation process is also carried out by the file system control section 61 in FIG. 2. At this point, data has yet to be written to the file management information 63 of the recording media 37. The management data having undergone the sorting process is held by the file system control section 61.

Then an update process is carried out (in step S18) to record collectively both the management data generated during the sorting process of step S15 and the management data generated during the region reservation process of step S17 to the file management information 63 inside the recording media 37. After the update process, step S13 is reached again for another process of determining the data amount.

If it is determined in step S13 that one write unit of write data has yet to be accumulated in the media buffer 58, then it is determined (in step S19) whether or not a predetermined time $t_0$ has elapsed since the last recording of data to the recording media 37. For example, the predetermined time $t_0$ is set to 20 seconds.

If it is determined that the time $t_0$ has elapsed, then step S14 is reached. In step S14, the data accumulated so far in the buffer 58 is written to the recording media 37. At this point, the write history information is also attached to the write data.

If it is determined in step S19 that the time $t_0$ has yet to elapse since the last write operation, step S13 is reached again for another determination.

If it is determined in step S16 that the reserved region need not be expanded, step S13 is also reached again for another determination. Thus the file management information 63 on the recording media 37 is updated collectively together with the management data about the data written so far, solely when the reserved region is to be expanded. In this manner, the update count of the file management information 63 is minimized.

A typical process of generating the data constituting write history information will now be explained by referring to the flowchart of FIG. 5. It is the write history information generation section 57 in FIG. 2 that generates the data making up the write history information.

As shown in FIG. 5, it is initially determined whether or not it is time to write one write unit of data accumulated in the media buffer 58 to the recording media 37 (in step S21). If it is determined that it is not time yet to write the data, an appropriate write timing is awaited.

If it is determined that the write timing is reached, then it is determined whether or not the first added data or the second added data has yet to be accumulated to a level commensurate with the data amount of one file placement (in step S22).

If there exists data yet to reach the data amount of one file placement, then the first or the second added data yet to reach the data amount of one file placement is placed as the data making up the write history information (in step S23). If the most recently generated write history information also had the first or the second added data placed likewise, then data reflecting the difference between the first or the second added data and the last generated write history information is placed.

Furthermore, the data indicating the placement of various types of data within one write unit of data is added as the data constituting the write history information. Also, the data indicative of a version or of whether data is complete is added as needed as the data making up the write history information. These kinds of data are added to make the data constituting the write history information fulfill one write unit of data.

The generated data as the write history information is supplied to the media buffer 58 and stored into the last region of the media buffer 58. When the data constituting the write history information is placed at the end of the media buffer 58, the write history information is retrieved lastly therefrom upon data transfer from the media buffer 58 to the recording media 37. As a result, where the write history information is correctly written to the recording media 37, each write unit of the data written along with the write history information can be handled as effective data recorded appropriately to the recording media 37.

Through the use of the write history information placed and written to the recording media 37 as described above, it is possible to resume correctly the process of data recording to the recording media 37 if the process is halted halfway for some reason. That is, it is possible to determine from the write history information up to where the data has been written in the reserved region.

[5. Specific Examples of the Data Recording Operations]

Some specific examples of the recording operations will now be explained by referring to FIGS. 6A through 12D.

Of the FIGS. 6A through 12D, those identified by reference character A indicate how the input data to the recording section or the data generated thereby is typically stored. Specifically, the stored state corresponds to the data being held in the buffers 52, 53 and 54 in FIG. 2. In the figures, main line data refers to data in a video-audio multiplex file in which the video data and audio data are multiplexed to make up the main data. The first added data and second added data refer to the added data explained above. The write history information refers to the data generated upon data recording as discussed above.

Of the figures, those identified by reference character B indicate the stored state of data in the media buffer 58.

Of the figures, those identified by reference character C indicate the recorded states of (part of) the regions on the recording media 37.

Also of the figures, those identified by reference character D indicate the management data written as file management information.

In FIGS. 6A through 12D, examples are given using one write unit having eight files placed therein. The recording region of the recording media 37 shows eight recording areas M1 through M8. One recording area M1 has a storage capacity commensurate with one write unit of data.

In FIGS. 6A through 12D, each blank region indicates the state in which no data is written, and each shaded region indicates either a data-written state or a reserved state.

The explanation below will be given beginning with FIGS. 6A through 6D.

In reference to FIGS. 6A through 6D, the reservation process of step S11 is first explained along with the process performed in step S12 typically to write reservation information as management data.

In the state of FIGS. 6A through 6D, there is neither input data nor generated data as shown in FIG. 6A. No data is stored in the media buffer 58 as shown in FIG. 6B. In this state, a plurality of recording areas are reserved in the memory card. In this example, as indicated in FIG. 6C, five recording areas M1 through M5 are allocated as a reserved region R1.

Data about the reserved region R1 (i.e., data indicating that the areas M1 through M5 have been reserved) is written in step S12 as management data to a region of the file management information 63 managed by the file system control section 61 on the side of the recording media 37.

FIGS. 7A through 7D show the state in which one write unit of data is input or generated, with the reservation completed as indicated in FIGS. 6A through 6D. As shown in FIG. 7A, data d11 whose amount exceeds seven file placement units is stored in the buffer as the main line data (video data and audio data). The first added data d21 and the second added data d31 have a data amount of less than one write unit each.

FIGS. 8A through 8D show an example in which given the data input as indicated in FIGS. 7A through 7D, relevant write history information is generated and written to the media buffer.

In this state, the first added data d21 and the second added data d31 having a data amount of less than one write unit each are placed unmodified into the data d41 constituting the write history information. This placement process corresponds to step S23 in the flowchart of FIG. 5. Of the first added data d21 and second added data d31, those that can be omitted may be omitted before the data are placed into the write history information.

Also, placement data is added into the write history information, the data identifying each of the data placed in units of eight files in the media buffer 58. The data adding process corresponds to step S24 in the flowchart of FIG. 5. The data constituting the write history information generated so far is considered data whose amount corresponds to one file placement unit.

Of the data d11 whose amount exceeds seven file placement units, data d12 of seven file placement units is transferred as the main line data to the media buffer 58 for storage therein. Further, the data d41 constituting the write history information is stored into a region measuring one file placement unit at the end of media buffer 58. Data d13 whose amount is less than one file placement unit of the main line data is left stored in the video buffer or elsewhere for the continuous storage process. Also, the first added data d21 and second added data d31 placed in the data d41 constituting the write history information are left stored in their respective buffers for the continued storage process.

When the processes so far have been carried out, one write unit of data is stored in the media buffer 58. Then, the process moves on to the write process of FIGS. 9A through 9D.

During the write process of FIGS. 9A through 9D, one write unit of data stored in the media buffer 58 is transferred successively beginning with the start data to the recording media 37 and recorded to the first area (area M1 in this example) of the reserved region therein. The state in which the data is written to the area M1 is the same as the state in which the data was stored in the media buffer 58, in that the main line data d12 is placed into seven file placement units from the beginning and the data d41 making up the write history information is placed into one file placement unit at the end.

The recorded data above indicates that as shown in FIG. 9D, the main line data d12 and the data d41 of the write history information are placed in the area M1. Also, the area M1 is changed from a reserved region into a recorded region, and the reserved region R2 is changed into areas M2 through M5. At this point, however, the updated management data is held inside the file system control section 61 in FIG. 2 and has yet to be recorded to the recording media 37.

FIGS. 10A through 10D show the state in which an additional one write unit of 1 BU data is input or generated, in the state that the writing process indicated in FIGS. 9A through 9D is carried out. As shown in FIG. 10A, data d14 whose amount exceeds six file placement units is stored as the main line data (video data and audio data) in the buffer. Incidentally, the buffer for main line data such as one shown in FIG. 10A is a ring buffer in which the locations of stored data are successively shifted.

Also, the first added data d22 is shown as one file placement unit of data being stored. The amount of the second added data d32 continues to be less than one file placement unit.

FIGS. 11A through 11D show the state in which, subsequent to the stored state in FIGS. 10A through 10D, the data is written to the media buffer 58 and write history information is generated.

In this state, of the data d14 (FIG. 10A) whose amount exceeds six file placement units, data d15 whose amount corresponds to six file placement units is transferred as the main line data to the media buffer 58 for storage therein. Also, the first added data d22 of one file placement unit is transferred to the media buffer 58 for storage therein. Furthermore, data d42 constituting the write history information is stored into a region of one file placement unit at the end of the media buffer 58.

The second added data d32 whose amount is less than one file placement unit is placed into the data d42 making up the write history information. In this case, the data representing the difference between the second added data d31 placed in the most recent write history information on the one hand and the second added data d32 on the other hand is placed as the data d42.

When the processes so far have been carried out, the data of eight file placement units making up one write unit (1 BU) is stored in the media buffer 58. Then, the process moves on to the write process of a second cycle shown in FIGS. 12A through 12D. The main line data d16 whose amount is less than one file placement unit and the second added data d32 whose amount is less than one file placement unit are left stored in their respective buffers for the continuous storage process.

In the write process of FIGS. 12A through 12D, one write unit of data stored in the media buffer 58 is transferred successively beginning with the start data to the recording media 37 and recorded to the first blank area (area M2 in this case) of the reserved region. The state in which the data is recorded to the area M2 is also the same as the state in which the data was stored in the media buffer 58, in that the main line data d15 is placed into six file placement units from the beginning, that the first added data d22 is placed into the next one file placement unit, and that the data d42 making up the write history information is placed into one file placement unit at the end.

The recorded data above indicates that as shown in FIG. 12D with management data, the main line data d12 and the data d41 of the write history information are placed in the area M2. The area M2 is changed from a reserved region to a recorded region, and the reserved region R3 is changed into areas M3 through M5. At this point, the updated management data is still held by the file system control section 61 in FIG. 2 and has yet to be recorded to the recording media 37.

When the reserved region is changed so that its remaining capacity has become less than a predetermined amount, a process is carried out to expand the reserved region. The process of expanding the reserved region is performed in step S17 of the flowchart in FIG. 4. Thereafter, the management data for which the reserved region is expanded and the management data stemming from the sorting process of step S15 are recorded collectively and simultaneously to the file management information 63 of the recording media 37 in step S18.

[6. Typical Sorting of Management Data]

Explained below in reference to FIGS. 13A through 14B is a specific example in which data is sorted in step S15 of the flowchart in FIG. 4. In this example, the management data about a continuous region of the recording media where a pair of video data and audio data is recorded as one set of data is sorted.

With this example, FIG. 13A shows recorded states of individual areas on the recording media, and FIG. 13B indicates the state in which the management data is generated. It should be noted that in the state of FIG. 13B, the management data is merely generated and has yet to be recorded to the file management information 62 (FIG. 2) of the recording media 37.

With this example, FIG. 13A shows how data is recorded to three areas M1, M2 and M3, i.e., how the main line data d11, d12 and d13, the first added data d21 and d22, and the second added data d31 are recorded separately in the three areas. Theses kinds of data are recorded to the three areas M1, M2 and M3 in the order in which they were generated, as explained above by referring to FIGS. 6A through 12D.

In this case, the write addresses (recording regions) locating the data d41, d42 and d43 making up the write history information at the end of each of the areas M1, M2 and M3 are arranged into one set of management data D40 about the write history information.

Based on the information about the control whereby the individual kinds of data are placed in the media buffer 58, the write addresses identifying the main line data d11, d12 and d13 are determined. This generates management data D10 indicating the write addresses of the main data d11, d12 and d13, etc.

Likewise, based on the information about the control whereby the individual kinds of data are placed in the media buffer 58, the write addresses identifying the first added data d21 and d22 are determined. This generates management data D20 indicating the write addresses of the first added data d21 and d22, etc.

Furthermore, based on the information about the control whereby the individual kinds of data are placed in the media buffer 58, the write address identifying the second added data d31 is determined. This generates management data D30 indicating the write address of the second added data d31, etc.

The states shown in FIGS. 13A and 13B indicate what takes place when the management data is merely generated following the execution of step S15 in the flowchart of FIG. 4. The management data has yet to be recorded to the recording media 37 as the file management information 62.

Then steps S16 and S17 in the flowchart of FIG. 4 are carried out for transition to the process resulting in the states shown in FIGS. 14A and 14B.

That is, as indicated by step S16 in the flowchart of FIG. 4, a necessary amount of data (five file placement units in this case) is allocated as a reserved region. New areas M6, M7 and M8 are thus set aside as the reserved region, which is indicated by management data.

Further, step S17 in the flowchart of FIG. 4 is carried out to write collectively both the management data generated during the process of FIGS. 13A and 13B and the management data about the areas M6, M7 and M8 as the newly reserved region (i.e., management data shown in FIG. 14B). That is, the file management information 62 on the recording media 37 becomes the management data shown in FIG. 14B.

As described above, according to the imaging apparatus embodying the present invention, the video data and audio data generated during the imaging process, along with added data attached thereto, are written to the memory card in the order in which they were generated in (i.e., input to) the buffer, with various kinds of data coexisting in increments of one file placement unit. Thus, at write time, data is written to the recording media in increments of one write unit while any data delays between the recording apparatus (i.e., imaging apparatus) and the recording media are minimized. Given this arrangement, even if the write process is stopped halfway due to unforeseen irregularities (e.g., power failure), the data being generated by the ongoing imaging process and recorded to the recording media is preserved with a minimum of data loss.

With the data written to the recording media, the management data is updated in such a manner that the recorded data is handled as continuous data in each of the different data categories involved from the viewpoint of file management. Thus, at reproduction time, the data can be reproduced correctly and quickly using the management data.

When data is transferred from the media buffer 58 to the recording media 73 for recording to the latter, each write unit of data is suffixed with data of write history information which is a guide data. Thus, based on the data of the write history information, it is possible to restore the added data attached to the recorded video data and audio data. That is, the data of the the write history information is supplemented with the first added data and the second added data, each type of added data being less than one file placement unit in capacity. As a result, even if the first and the second added data are not recorded as part of the principal data to the recording media upon interruption of the write operation thereto, the added data can be restored.

[7. Variations]

The foregoing description of the embodiment of this invention has focused on the structure and processing operations of the recording apparatus incorporated in the imaging apparatus such as a video camera. Alternatively, the present invention may be applied to other diverse kinds of recording apparatuses. That is, the recording processing similar to what was discussed above may be practiced in recording apparatuses designed to write video data and audio data to recording media, other than the imaging apparatus. As another alternative, this invention may be applied to recording apparatuses that record simultaneously the main data other than video data and audio data and the added data attached to the main data.

The specific data placement states shown in FIGS. 6A through 14B are illustrations explanatory of the principles of the above-described embodiment. Actual data placements may also be other than those illustrated in the accompanying drawings.

Where the processes of the present invention are implemented to bring about recording apparatuses dedicated to specific purposes such as the imaging apparatus shown in FIG. 1, the inventive processes may be practiced in an information processing apparatus (system) typically made up of a personal computer and its peripherals. That is, programs (i.e., software) for executing the processes of the invention may be installed into the personal computer, and the programs may be carried out to record various kinds of data to recording media on the computer in a manner similar to what was discussed above in this specification.

The data structure of the above-described write history information is an example and may be replaced by any other suitable structure. The data placements explained above are also examples and may be replaced by other suitable data placements.

The present application contains subject matter related to that disclosed in Japanese Priority Patent Application JP 2010-028253 filed in the Japan Patent Office on Feb. 10, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
an input section configured to input main data and added data attached to said main data; and
a recording control section configured such that when said main data and said added data input through said input section have each reached a predetermined data amount, said recording control section temporarily stores said main data and said added data in units of said predetermined data amount; and that when the sum of the amounts of the temporarily stored data has reached a specific data amount, said recording control section transfers the temporarily stored data to recording media for recording thereto in a single file; said recording control section further registering management data about the recorded data to a file system of said recording media in such a manner that said management data is sorted by the data type of said recorded data.

2. The recording apparatus according to claim 1, wherein the temporarily stored main data and added data are transferred and recorded collectively to said recording media in the same order in which said main data and said added were temporarily stored.

3. The recording apparatus according to claim 2, wherein said predetermined data amount to be temporarily stored is equal to the amount of an erase block unit of said recording media, and said specific data amount to be written to said recording media is equal to the amount of an integer multiple of said erase block unit.

4. The recording apparatus according to claim 3, wherein, when said management data is registered to said file system, a region to which to record the data on said recording media is reserved simultaneously.

5. An imaging and recording apparatus comprising:
an imaging section configured to acquire video data through imaging; and
a recording control section configured such that when video data acquired by said imaging section and added data attached to said video data have each reached a predetermined data amount, said recording control section temporarily stores said video data and said added data in units of said predetermined data amount; and that when the sum of the amounts of the temporarily stored data has reached a specific data amount, said recording control section transfers the temporarily stored data to recording media for recording thereto in a single file; said recording control section further registering management data about the recorded data to a file system of said recording media in such a manner that said management data is sorted by the data type of said recorded data.

6. The imaging and recording apparatus according to claim 5, wherein the temporarily stored video data and added data are transferred and recorded collectively to said recording media in the same order in which said video data and said added were temporarily stored.

7. The imaging and recording apparatus according to claim 6, wherein said predetermined data amount to be temporarily stored is equal to the amount of an erase block unit of said recording media, and said specific data amount to be written to said recording media is equal to the amount of an integer multiple of said erase block unit.

8. The imaging and recording apparatus according to claim 7, wherein, when said management data is registered to said file system, a region to which to record the data on said recording media is reserved simultaneously.

9. A recording method comprising the steps of:
when input or generated main data and added data attached to the main data have reached a predetermined data amount, temporarily storing said video data and said added data in units of said predetermined data amount;
when the sum of the amounts of the temporarily stored data has reached a specific data amount, transferring the temporarily stored data to recording media for recording thereto in a single file; and
registering management data about the recorded data to a file system of said recording media in such a manner that said management data is sorted by the data type of said recorded data.

10. A non-transitory storage medium storing a program that, when executed by an information processing apparatus, causes the information processing apparatus to execute an information processing method comprising the steps of:
when input or generated main data and added data attached to the main data have reached a predetermined data amount, temporarily storing said main data and said added data in units of said predetermined data amount;
when the sum of the amounts of the temporarily stored data has reached a specific data amount, transferring the temporarily stored data to recording media for recording thereto in a single file; and
registering management data about the recorded data to a file system of said recording media in such a manner that said management data is sorted by the data type of said recorded data.

11. A recording apparatus comprising:
input means for inputting main data and added data attached to said main data; and
recording control means configured such that when said main data and said added data input through said input means have each reached a predetermined data amount, said recording control means temporarily stores said main data and said added data in units of said predetermined data amount; and that when the sum of the amounts of the temporarily stored data has reached a specific data amount, said recording control means transfers the temporarily stored data to recording media for recording thereto in a single file; said recording control means further registering management data about the recorded data to a file system of said recording media in such a manner that said management data is sorted by the data type of said recorded data.

12. An imaging and recording apparatus comprising:

imaging means for acquiring video data through imaging; and recording control means configured such that when video data acquired by said imaging means and added data attached to said video data have each reached a predetermined data amount, said recording control means temporarily stores said video data and said added data in units of said predetermined data amount; and that when the sum of the amounts of the temporarily stored data has reached a specific data amount, said recording control means transfers the temporarily stored data to recording media for recording thereto in a single file; said recording control means further registering management data about the recorded data to a file system of said recording media in such a manner that said management data is sorted by the data type of said recorded data.

* * * * *